No. 816,104. PATENTED MAR. 27, 1906.
H. LAURENT.
MASTICATOR.
APPLICATION FILED MAR. 10, 1903.
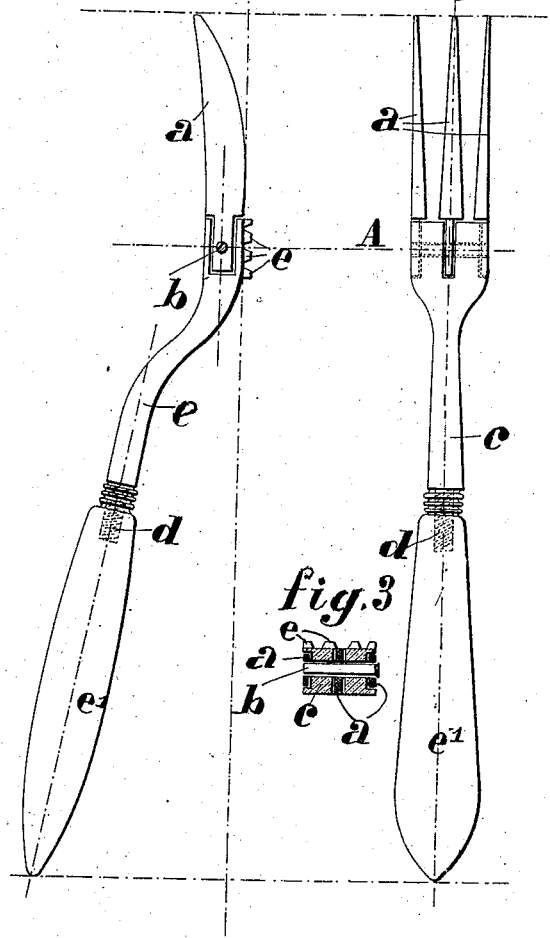
WITNESSES
Albert Jones
Samuel Percival
INVENTOR
Henri Laurent
By his Attorneys
Wheatley & Mackenzie

UNITED STATES PATENT OFFICE.

HENRI LAURENT, OF PARIS, FRANCE.

MASTICATOR.

No. 816,104.     Specification of Letters Patent.     Patented March 27, 1906.

Application filed March 10, 1903. Serial No. 147,113.

*To all whom it may concern:*

Be it known that I, HENRI LAURENT, a citizen of the French Republic, residing at 148 Rue Lecourbe, Paris, France, have invented certain new and useful Improvements in Masticators; and I do hereby declare the following to be a full, clear, and exact description of the invention, such as will enable others skilled in the art to which it appertains to make and use the same.

This invention relates to an improved masticator or device for cutting food into small pieces and disintegrating the same by crushing for the purpose of facilitating digestion;
and it consists of a number of parallel cutting-blades provided with projections or pyramidal points with square edges and a socket of handle.

In the accompanying drawings, Figure 1 is an elevation; Fig. 2, a plan; Fig. 3, a section through A B; Fig. 4, a section through C D.

The masticator has three curved plates or blades *a*, furnished on the convex surface with a cutting edge. On a solid part *c* at the root of the plates *a* a series of projections *b* with square edges is arranged, the solid part terminating in a rod which fits into a socket *e* at the point *d* by means of a screw-threaded tail piece. The device is thus separable into two parts—the socket and the masticator proper—and may be carried in the pocket. The masticator is made of cast-steel or any other suitable metal.

The food to be disintegrated—generally meat—is held by means of a fork and cut in various directions by the cutting plates or blades, which pass between the prongs of the fork. The food thus cut up is then crushed by being pressed under the projections *b*, the square edges of which effect the work of disintegration.

What I claim, and desire to secure by Letters Patent, is—

1. A device for use at table for cutting and disintegrating food adapted to replace the ordinary table-knife, consisting of parallel curved cutting-blades adapted to cut the food into small pieces, a solid part or shank formed at the roots of the blades, and projections with square edges formed on the shank and adapted to effect the crushing of the cut food.

2. A device for use at table for cutting and disintegrating food adapted to replace the ordinary table-knife, consisting of parallel curved cutting-blades adapted to cut the food into small pieces, a solid part or shank formed at the roots of the blades, projections with square edges formed on the shank and adapted to effect the crushing of the cut food, and a detachable handle, substantially as described.

In testimony whereof I have affixed my signature in presence of two witnesses.

HENRI LAURENT.

Witnesses:
   JOHN K. GOWDY.
   AUGUSTUS E. INGRAM